April 3, 1962  E. A. ZUZELO  3,027,886
MASONRY SAW
Filed Oct. 27, 1959  2 Sheets-Sheet 1
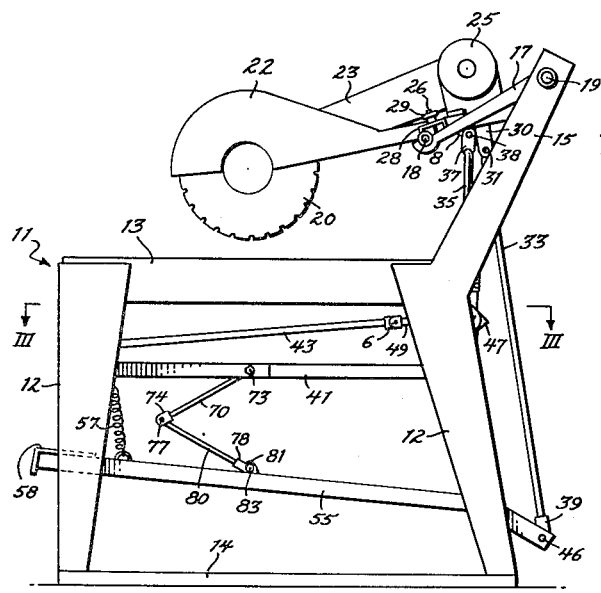
Fig.1.
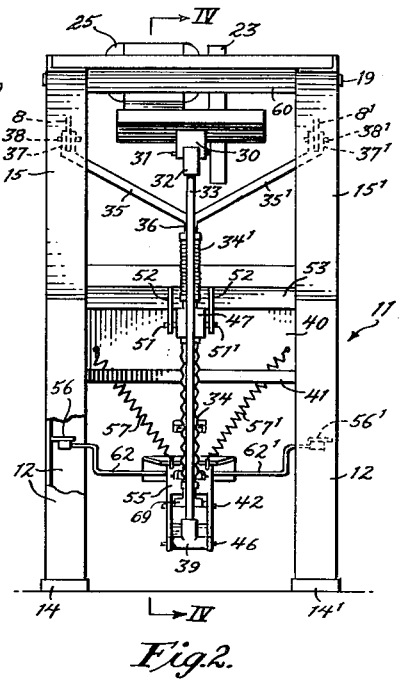
Fig.2.
Fig.3.
Fig.6.
INVENTOR.
EDWARD A. ZUZELO
BY Charles A. McClure
ATTORNEY.

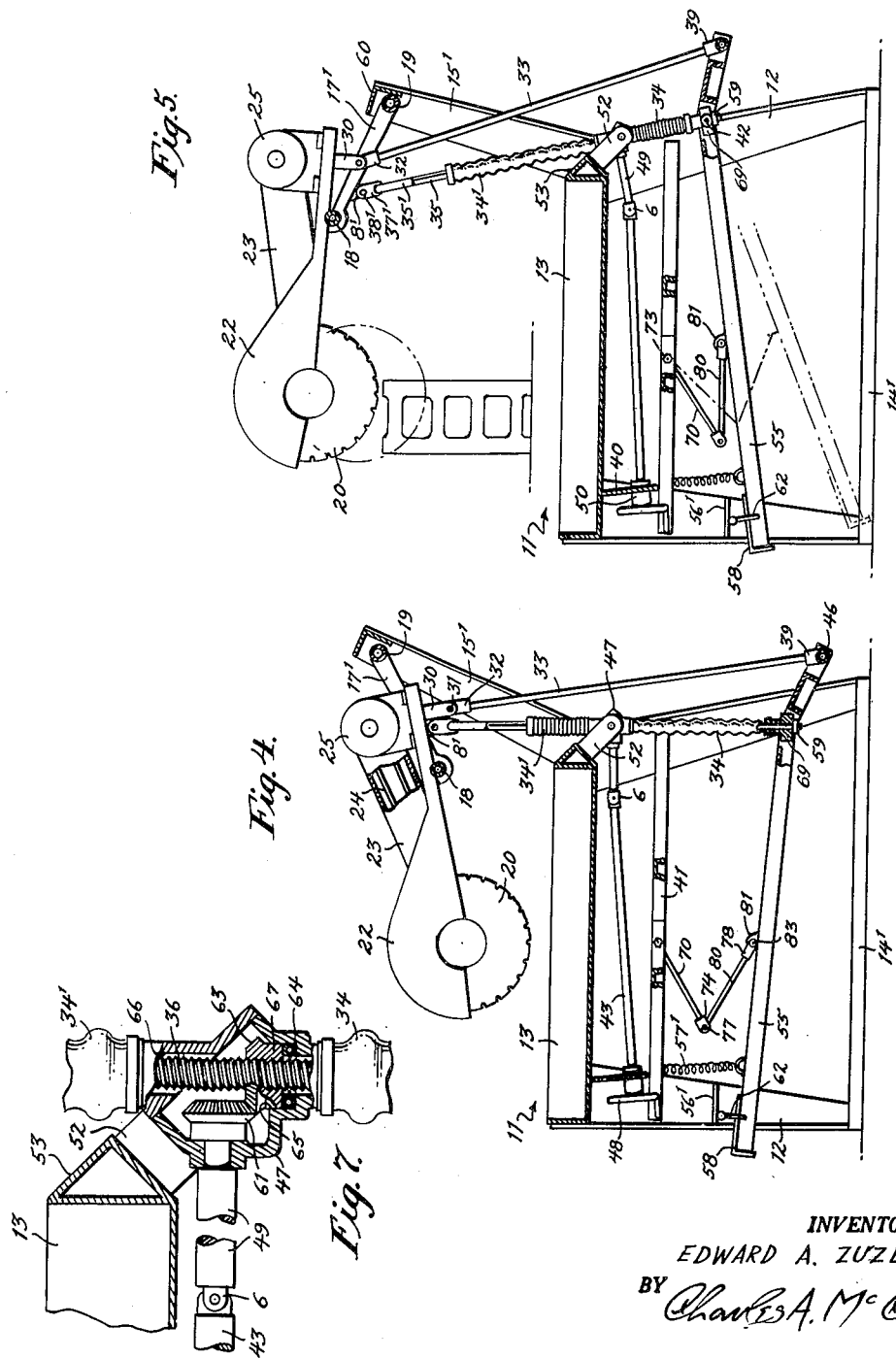

United States Patent Office 3,027,886
Patented Apr. 3, 1962

3,027,886
MASONRY SAW
Edward A. Zuzelo, 652 Broadacres Road, Narberth, Pa.
Filed Oct. 27, 1959, Ser. No. 849,099
17 Claims. (Cl. 125—13)

This invention relates to machines for cutting or otherwise working masonry and similar articles, concerning especially means for adjusting and controlling the height and the angular position or tilt of a cutter or other tool assembly pivotally mounted over a work surface.

It is customary to cut brick, concrete, tile, and the like with a rotary saw or cutting blade of a cutter assembly pivotally mounted above a work surface on which rests the material to be cut. The blade is depressed onto and into the material most conveniently by pivoting the cutter assembly downward, thereby also changing its angle of attack or tilt. Many linkages are known for changing the rest position of the blade above the work surface, as is desirable when changing the size of the article to be cut. However, in conventional equipment in which the pivotal mounting remains at a given height so that the height of the blade is adjusted only by tilting it to accommodate the different articles, an undesirably extreme tilt is imparted to the cutter assembly at the extremes of adjustment. In certain other constructions the entire mounting of the cutter assembly may be raised or lowered bodily, moving the mounting pivot vertically without changing the tilt angle, but such arrangements involve additional mechanical complication that is both inconvenient to operate and expensive to construct and maintain.

A primary object of the present invention is improved height adjustment and tilt control for a pivotally mounted cutter assembly or the like. An object is automatic compensation for or counteraction of tilt imparted to a pivotally mounted cutter assembly upon adjustment of the rest position or height of the saw blade contained in the assembly. A particular object is novel support and interconnection of a cutter assembly and a foot-actuated tilt-controlling lever of a masonry saw. Other objects of this invention, together with means and methods for attaining the various objects, will be apparent from the following description and the accompanying diagrams.

FIG. 1 is a side elevation of a masonry saw constructed according to the present invention; FIG. 2 is a rear elevation of the apparatus of FIG. 1; and FIG. 3 is a sectional plan of the apparatus of the preceding views, taken at III—III of FIG. 1. FIG. 4 is a side sectional elevation of the apparatus of the previous views, taken at IV—IV of FIG. 2; FIG. 5 is a side sectional elevation of the same apparatus, taken medially and longitudinally thereof as in FIG. 4, but with the solid lines showing a high rest position and with the broken lines showing a corresponding (lower) cutting position. FIG. 6 is a fragmentary rear elevation, partly in section, of the apparatus of the preceding views; and FIG. 7 is a sectional side elevation of the same apparatus, taken at VII—VII of FIG. 6.

In general, the objects of the present invention are accomplished, in a machine for sawing masonry, by means of a fixed frame, a tilting cutter assembly, linkage interconnecting the frame and the cutter assembly, a longitudinally movable support arm pivotally supporting the cutter assembly, adjusting means in operative connection with the support arm and adapted to move the arm longitudinally, a tilt-controlling lever pivotally carried by the support arm, and linkage pivotally interconnecting the cutter assembly and the tilt-controlling lever.

FIG. 1 shows, in side elevation, saw frame 11 having four legs 12 (only two being visible in this view) with pan 13 at the top and pair of skids 14, 14' (only one visible) at the bottom of the legs. Extending upward from the top right (i.e., rear) corner of the frame is pair of standards 15, 15' (one visible here) carrying pivot pin 19 at the top. Pivotally mounted on pin 19 is pair of junction arms 17, 17' (one visible) carrying pivot pin 18 at their other end. Pivotally mounted on pin 18 is cutter assembly 21. Inverted U-bracket 30 connected to the bottom of the cutter assembly underneath the motor carries pivot pin 31, which holds coupling 32 (here partially hidden) for depending tilt arm 33.

The cutter assembly comprises principally blade guard or housing 22 surrounding cutter blade 20 at one end of the assembly, motor 25 at or near the other end of the assembly, and belt guard 23 partially enclosing drive belt 24 (see FIG. 4) extending from the motor to the blade. The usual electrical connections to the motor and hydraulic connections for lubricant supplied to the blade are omitted for simplicity of the showing. The cutter assembly rests on pivot pin 18, which it receives in suitable semi-circular hollows or indentations present in the bottom of the assembly. This pivot pin rests in corresponding hollows in the end of junction arms 17, 17' and is secured to each of the arms. The securing means on each side comprises bolt 26 extending upward through and above the arm and passing through the bore of inverted U-clamp 28, which rests with its opposite ends against the arm and the pin, respectively, together with nut 29 threaded onto the bolt to retain the clamp in place. Movable support arm 35 depends from clevis 37, to which pivot pin 38 in bored boss 8 on the underside of the junction arm holds the end of the support arm in place between the locations of pivot pins 18 and 19. Corresponding members, hidden in this view, appear (indicated by like reference numerals primed) in FIG. 2, which is a further view of the same apparatus from the rear.

FIG. 2 provides additional details of the elements already mentioned, including those not visible in FIG. 1, such as rear transverse member 60 tying the top portions of standards 15, 15' together near pivot pin 19, also front transverse member 40 bridging the front legs and abutting the underside of the pan. It is apparent that support arm 35 at the one side is joined by corresponding support arm 35' at the other side, base portion 36 of the resulting Y-shaped supporting arm structure being largely concealed behinde tilt arm 33 in this rear view. The base portion, which is threaded for most of its length to the lower end, is covered by pair of expansible bellows 34 below and 34' above gearbox or housing 47, the ends of the bellows being attached to the support and to the gearbox, all of which are partly visible extending to the sides of the tilt arm. The gearbox or arm-constraining means is supported (as appears more fully in FIG. 6) pivotally by pair of bolts or screws 51, 51' threaded into pair of bosses 54, 54' on opposite sides of the housing through apertures in bifurcated bracket 52. The bracket is affixed to the frame by means of angle brace 53 at the rear end of the pan, as subsequently shown in more detail. The lower end or base of the support carries foot lever or treadle 55 by means of T-shaped coupling member 69 (partly hidden in this view) bored to receive the threaded end and retained thereon by nut 59 (visible in FIGS. 4 and 5). The extremities of the T-member's cross-bar accommodate pivot pins 42 extending through apertures therein. Similarly T-shaped coupling 39 affixed onto the lower end of the tilt arm connects pivotally to the bifurcated rear end of the tilt lever which straddles the coupling by pin 46. extending through a bore in the cross-bar of the coupling and through aligned apertures in the straddling portions of the lever end. Cross brace 41 extends in the form of an X from the front legs to the rear legs, being attached to the legs somewhat nearer to the pan than to the skids and underneath and in contact with front transverse piece 40.

Connected to transverse piece 40 are biasing extension springs 57, 57', which connect to the top of the foot lever or treadle near the pedal or front end. At opposite sides, just ahead of the springs, the foot lever carries guides 62, 62' spaced inwardly of the inside surface of the respective front legs. Affixed to the legs are stops 56, 56' against which the ends of the guides are urged by the springs in the rest position of the lever (i.e., front end up). FIG. 3, which represents a section taken through the frame just underneath the pan, shows in plan many of the elements appearing in the bottom portions of FIGS. 1 and 2, including the stabilizing linkage for the foot lever.

Just ahead of the crossover of the brace, pair of transverse apertures (one in each brace member) receive short sleeves 71, 71'. Between these sleeves, which are affixed to the brace members, is located sleeve 72, which terminates lever or link 70 of the stabilizing linkage at its top or upper end; headed pin 73 passes through these sleeves to provide a top pivot for the linkage. At its bottom or lower end, upper link 70 carries U-piece 74 provided with apertures and pair of sleeves 75, 75' much as in the cross brace. Lower lever or link 80 with sleeve 76 at its upper end is held pivotally between the pair of sleeves on the upper link by headed pin 77. The lower end of this second or lower link also is like the first, terminating in U-piece 78 carrying sleeves (hidden) like those at the lower end of link 70. Headed pin 83 holds the lower end of the lower link pivotally astraddle pair of lugs 81, 81' (one visible in FIG 1) affixed to and upstanding from the top surface of the foot lever approximately midway of its length. It will be apparent that the scissors-like stabilizing linkage so formed precludes side sway of the foot lever as it moves up and down.

Centered on the rear face of transverse piece 40 between the front legs is pillow block 50 for handwheel 48. Handwheel shaft 43, which is broken away in FIG. 3 for clarity, is rotatively mounted in the pillow block and extends slightly upward toward the rear of the apparatus, where it terminates in universal joint 6. From the universal joint, connecting shaft 49 proceeds to the rear and enters the gearbox, which appears in greater detail in FIGS. 6 and 7. The function of the gear box and associated elements is to raise and lower the support arms carrying the cutter assembly, thereby adjusting the height of the pivot about which the cutter assembly tilts when the foot lever is depressed, as more fully set forth hereinafter.

FIGS. 4 and 5 show the previously illustrated apparatus in longitudinal vertical section just to the left of the center line. FIG. 4 shows a low rest position in solid lines, while FIG. 5 shows a high rest position in solid lines and a corresponding lower operating position in broken lines. Thus, a small object may be cut at the position shown in FIG. 4, and a full-sized concrete block on end as suggested in FIG. 5. Means for moving the support longitudinally to adjust the height of the cutter assembly, thereby moving it upward or downward from one rest position to another, appear in detail in the succeeding views.

FIGS. 6 and 7 show in sectional rear and side elevation, respectively, the previously mentioned gearbox and associated elements. Shaft 49, extending from the universal joint, passes into a suitable aperture at the front of the housing and carries bevel gear 61 affixed to its end. Threaded base portion 36 of the support arm at the rear of the apparatus passes down through vertical bore 66 of the housing and through the complementarily threaded internal bore of bevel gear 63, whose outside surface is in mesh with the corresponding surface of gear 61. Internal recess 65 at the bottom of the housing receives shoulder 67 of the internally threaded gear, together with underlying thrust bearing 64, which supports the bottom of the gear shoulder. The pivotal support of the housing within bracket 52, previously mentioned, is especially clear in FIG. 6.

The operation of the described and illustrated apparatus of this invention is readily understood. When the handwheel is in such a position that the threaded support is largely below the gearbox, as is shown in FIGS. 1 to 4, inclusive, the cutter assembly is at a low rest position, having swung downward about the fixed pivot at the end of the interconnecting junction arms. An even lower position of the cutter assembly and associated movable elements is attainable by depression of the foot lever, thereby lowering the cutting blade further. Such depression tilts the cutter assembly about the intermediate pivot pin (which, although adjustable for height, is fixed in position in this view) by means of the interconnecting linkage, including the tilt arm depending from the rear of the cutter assembly to the rear of the foot lever. Of course, the operator depresses the foot lever by placing his foot on the pedal at the front end and pressing downward; when he releases the downward pressure the biasing springs return it to the rest position. Comparison of this view of a low rest position with the higher rest and operating positions shown in FIG. 5 is most instructive.

FIG. 5 shows the apparatus with the handwheel rotated to raise the threaded support above the gearbox, thereby bodily raising the cutter assembly through an arc described by the ends of the junction arms. However, if that were the only change the front end of the cutter assembly would be tilted sharply upward, thereby placing the blade and the surrounding guard or housing at such an angle of attack that passage of the article to be cut under the blade would be impeded by the guard, which also no longer would protect the operator adequately at the front of the blade. Instead, in the apparatus of this invention, when the adjusting handwheel is turned to raise the support for the cutter assembly, the rear end of the foot lever rises also, as that lever pivots about the fulcrum formed by the stops at the front; this transmits an upward thrust to the rear of the cutter assembly through the depending tilt arm, thereby counteracting or largely compensating for such undesired tendency to tilt by superimposing a contrary tilt upon it. A high rest position appears in solid lines in FIG. 5, while the broken lines indicate the corresponding cutting position, to which the cutting blade is lowered by depression of the front end of the foot lever.

As an example, an apparatus embodiment of this invention as herein described and illustrated exhibits, between the highest and lowest rest positions, the angular variation (referred to the horizontal, the skids resting on a horizontal surface) set forth in the table below. These extreme settings, which place the axis of the cutting blade (18 inch diameter) at respective heights of about eleven inches and thirty inches above the top horizontal edge of the frame in this particular piece of apparatus, hardly alter the angle between the support and tilt arms, which remains substantially constant at nearly ten degrees.

At high rest position—Cutter assembly: 3½° above; junction arms: 43½° above.

At low rest position—Cutter assembly: 10° below; junction arms: 20° below.

The corresponding values for a somewhat smaller blade (14 inch diameter) are nine and eleven inches above the frame (the tilt arm having been lengthened slightly to lower the blade axis), assembly 1½° above and 18° below the horizontal at the respective rest positions, the junction arm angles being as with the larger blade.

Thus, the total change in angle of the cutter assembly from one extreme rest position to the other is less than one fourth (one third with the smaller blade) the change in angle of the junction arms pivoted on the standards at the rear. The angle of attack with regard to the article to cut remains entirely suitable, the cutter assembly being oriented only very slightly above the horizontal in the high rest position and at a minor acute angle below the horizontal in the low rest position despite a change of about one and one half feet in height of the blade above the frame. Depression of the foot lever lowers the cutter assembly from either rest position through a suitable further angle, such as up to from fifteen to twenty degrees, corresponding to a maximum of about half a foot change in height of the blade, so as to engage the article to be cut. The blade employed in apparatus having substantially the given characteristics may be somewhat larger or smaller than in the stated examples, if desired.

The advantage to the operator of increased range of height of the saw blade above the work surface (consequently increasing the dimensional range of the articles readily cut by the blade), as well as increased safety and ease of adjustment of the blade height, is obvious. As is customary, a spring or other resilient means may be interposed in the mounting of the cutter assembly or in the linkage for tilting it, with the object of permitting the blade to rise slightly instead of jamming and possibly breaking when encountering an especially hard portion of (or contaminant in) an article being cut. It will be apparent that the gearing and linkage for adjusting the blade height and control of the tilt of the cutter assembly can be varied, as for accommodating blades of various diameters, and that various of the parts may be combined or divided without departing from the claimed inventive concept. Hydraulic means may replace the gearing and related mechanism or part thereof without disadvantage. The full benefit of the invention will become apparent to those undertaking to practice it in the light of the above teaching.

The claimed invention:

1. Apparatus for sawing masonry, comprising a fixed frame, a tilting cutter assembly, linkage pivotally interconnecting the frame and the assembly, a longitudinally movable arm-like support pivotally supporting the assembly, adjusting means in operative connection with the support and adapted to move the support longitudinally, a tilt lever pivotally carried by the support, the tilt lever being free of pivot axes fixed with respect to the frame and having a pivot axis fixed with respect to the arm-like support and movable longitudinally therewith, and linkage pivotally interconnecting the assembly and the tilt lever.

2. The apparatus of claim 1 wherein the frame carries stop means, against which a free end of the tilt lever is adapted to rest, and carries also biasing means operatively connected to the tilt lever and adapted to urge the free end of the lever against the stop means.

3. Apparatus for sawing masonry, comprising a fixed frame, a tilting cutter assembly, linkage pivotally interconnecting the frame and the assembly, a longitudinally movable arm-like support pivotally supporting the assembly, adjusting means in operative connection with the support and adapted to move the support longitudinally, a tilt lever pivotally carried by the support, and linkage pivotally interconnecting the assembly and the tilt lever, the support comprising a threaded arm, and the adjusting means comprising a complementarily threaded member in mating engagement therewith and adapted to move the support arm longitudinally thereof.

4. Apparatus comprising a fixed frame, an upright affixed to and extending upward from the frame, a tilting cutter assembly, a junction arm pivotally interconnecting the cutter assembly and the frame, a reciprocable support arm pivotally supporting the cutter assembly, a tilt lever pivotally carried on the support arm, a tilt arm pivotally interconnecting the cutter assembly and the tilt lever, and adjusting means carried by the frame and adapted to move the support arm.

5. The apparatus of claim 4 including means attached to the frame and adapted to bias the tilt lever to a rest position, and wherein the respective pivot points are located so that adjustment of the adjusting means to move the support arm, and thereby move the cutter assembly and the junction arm interconnecting the assembly to the frame about an arc with respect to the pivot point at the junction of the junction arm with the frame, prevents the cutter assembly from tilting about its support by more than one third of the arc through which the junction arm moves.

6. The apparatus of claim 4 wherein the frame and the tilt lever are pivotally interconnected by scissors-like stabilizing linkage comprising a pair of levers pivotally attached to one another, one of the levers in the pair being also pivotally attached to the frame, and the other of the levers in the pair being pivotally attached to the foot lever.

7. In a masonry saw having a cutter assembly adjustable in height and tiltable in a generally vertical plane at any height to which it is adjusted, the combination of a frame, arm-constraining means affixed to the frame, an upright support arm adapted to reciprocate through and pivot about the arm-constraining means, the support arm supporting the cutter assembly and supporting also a tilt lever, and a tilt arm interconnecting the cutter assembly and the tilt lever independently of the support arm, the arm-constraining means being adapted to control the reciprocation of the support arm therethrough and thereby adjust the height of the cutter assembly.

8. In a masonry saw having a fixed frame and a tilting platform carrying a cutting assembly, the improvement comprising mechanism for providing a substantially level rest position for the platform irrespective of the height thereof and including a support arm with one end pivotally supporting the platform, a junction arm pivotally interconnecting the frame and the platform, height-adjusting means carried by the frame in operative connection with the support arm and adapted to move the arm longitudinally, a longitudinally movable tilt lever pivotally carried by the other end of the support arm, and a tilt arm pivotally interconnecting the platform and the tilt lever.

9. In a masonry saw having a fixed frame and a tilting platform carrying a cutter assembly, the improvement comprising a junction arm attached pivotally to both the frame and the platform, a tilt lever, a tilt arm intervening between and pivotally interconnected to the tilt lever and the platform, a support arm intervening between and pivotally interconnected to the tilt lever and the junction arm, and adjusting means mounted on the frame and adapted to move the support arm longitudinally and to hold it in place, the tilt lever having a rest position with a fulcrum fixed with respect to the frame, the tilt lever being movable away from the rest position and free of the fulcrum in order to actuate the tilt arm, the tilt and support arms being oriented at a substantially constant angle to one another when the tilt lever is in the rest position at any longitudinal setting of the support arm.

10. The apparatus of claim 9 wherein the pivotal connection of the tilt lever to the support arm is located intermediate one end of the tilt lever and the pivotal junction of the tilt arm with the tilt lever, and the pivotal connection of the support arm to the junction arm is located intermediate the pivotal junctions of the tilt arm and the junction arm, respectively, with the platform.

11. The apparatus of claim 9 wherein the support arm is threaded over a major portion of its length intermediate the tilt lever and the platform, and the means adapted to move the support arm longitudinally comprises a complementarily threaded member located in mating engagement therewith and at a substantially fixed level with respect to the frame, the complementarily threaded member being adapted to be rotated by external means and thereby move the threaded member longitudinally.

12. The apparatus of claim 11 wherein the complementarily threaded member comprises a gear having an internally threaded bore receiving the threaded portion of the support arm, and the means adapted to move the support arm longitudinally includes also a drive shaft, a second gear affixed to the drive shaft and meshing with the first gear, and means for rotating the drive shaft.

13. In a masonry saw having a frame and a tilting cutter assembly carried by the frame, the combination of support means for the cutter assembly, the support means being mounted on the frame for substantially reciprocating movement with respect thereto, the support means being also pivotable about the locus of its mounting on the frame, the mounting locus being fixed with respect to the frame and reciprocable with respect to the support means and the cutter assembly being tiltably supported on the support means, whereby the cutter assembly is movable bodily upward and downward, upon reciprocating movement of the support means, and tilt means for the cutter assembly, the tilt means including a pivotable tilt lever supported for reciprocating movement by the support means and interconnected to the cutter assembly, whereby the cutter assembly is tiltable at its supported height upon pivoting movement of the tilt lever, the tilt means normally resting in contact with the frame, whereupon the support means, upon reciprocating movement thereof, is effective to pivot the tilt lever with respect to the frame sufficiently to impart to the cutter assembly through the interconnection thereto a tilt counter to the tilt that such movement of the support means otherwise would impart, whereby tilting of the cutter assembly in a rest position during bodily movement of the cutter assembly upward and downward is minimized.

14. Apparatus comprising a frame, an upright fixed with respect to and extending above the frame, a cutter assembly including a cutting blade mounted on a tilting platform located above the frame, a junction arm pivotally interconnecting the upright and the platform, a height-adjusting support arm pivotally supporting the platform, the support arm being movable in its lengthwise direction to support the platform at different heights above the frame, a tilt lever pivotally connected on the support arm, a tilt-controlling arm pivotally interconnecting the platform and the tilt lever, a stop adapted to limit travel of the tilt lever in one direction, and biasing means urging the tilt lever against the stop, travel of the tilt lever away from the stop against the urging of the biasing means being effective to pivot the lever about the support arm and move the tilt arm longitudinally to tilt the blade toward the frame.

15. Mechanism for adjusting the height of a rotary saw blade and for controlling the tilt of a cutter assembly including the blade, comprising a fixed frame, pivot means at a fixed location with respect to and supported by the frame, pivot means movably located at a substantially fixed distance from the blade, the cutter assembly comprising a platform mounted on the movable pivot means, a junction arm interconnecting the fixed pivot means to the movable pivot means, the cutter assembly being pivotally tiltable about the movable pivot means, height-adjusting means including a support arm pivotally connected to the platform and effective to move the cutter assembly bodily through a limited arc about the fixed pivot means, a tilt lever pivotally supported on the support arm, tilt-controlling means including a tilt arm pivotally connected to the platform and to the tilt lever, the tilt lever having a rest position with a fulcrum fixed with respect to the frame, whereupon movement of the support arm to adjust the height of the cutter assembly moves the tilt lever about the fulcrum, the tilt lever being movable also independently of the fulcrum to actuate the tilt arm and thereby tilt the cutter assembly.

16. The mechanism of claim 15 wherein the pivotal junctions and pivot means and the fulcrum are so located that, during actuation of the height-adjusting means to move the movable pivot means through an arc of at least sixty degrees about the fixed pivot means, the tilt of the platform about the movable pivot means is limited to at most twenty degrees and of the cutting assembly to at most several degrees above the horizontal.

17. The mechanism of claim 15 including means for connecting the support arm pivotally to the platform, the connecting means comprising a housing pivotally carried by the frame and adapted to receive the support arm therethrough, arm-contacting means mounted on the housing and adapted to move the support arm lengthwise through the housing, and actuating means in operative connection with, and adapted to actuate, the arm-contacting means to move the support arm lengthwise and thereby move the cutter assembly bodily through the limited arc about the fixed pivot means.

References Cited in the file of this patent

UNITED STATES PATENTS

| | | |
|---|---|---|
| 2,399,239 | Martin | Apr. 30, 1946 |
| 2,726,651 | Tucker | Dec. 13, 1955 |
| 2,863,440 | Harclerode | Dec. 9, 1958 |
| 2,893,372 | Harclerode | July 7, 1959 |

UNITED STATES PATENT OFFICE
CERTIFICATE OF CORRECTION

Patent No. 3,027,886                      April 3, 1962

Edward A. Zuzelo

It is hereby certified that error appears in the above numbered patent requiring correction and that the said Letters Patent should read as corrected below.

Column 2, lines 4 and 5, for "cutter assembly 21" read -- the cutter assembly --; line 43, for "behinde" read -- behind --; same column 2, line 65, after "46" strike out the period; column 3, line 29, after "FIG" insert a period; column 4, line 70, after "to" insert -- be --.

Signed and sealed this 17th day of July 1962.

(SEAL)
Attest:

ERNEST W. SWIDER
Attesting Officer

DAVID L. LADD
Commissioner of Patents